July 25, 1939.　　　　E. A. BESSOM　　　　2,166,936
MACHINE FOR SHAPING UPPERS OVER LASTS
Filed Aug. 23, 1938　　12 Sheets-Sheet 1

Fig. 1.

INVENTOR:
Earl A. Bessom
by his Attorney
Frederick L. Emmons

July 25, 1939.   E. A. BESSOM   2,166,936
MACHINE FOR SHAPING UPPERS OVER LASTS
Filed Aug. 23, 1938   12 Sheets-Sheet 2

Fig. 2.

INVENTOR:
Earl A. Bessom
by his Attorney
Frederick L. Edmonds

July 25, 1939.   E. A. BESSOM   2,166,936
MACHINE FOR SHAPING UPPERS OVER LASTS
Filed Aug. 23, 1938    12 Sheets-Sheet 3

INVENTOR:
Earl A. Bessom
by his attorney
Frederick L. Emmons

July 25, 1939.  E. A. BESSOM  2,166,936
MACHINE FOR SHAPING UPPERS OVER LASTS
Filed Aug. 23, 1938    12 Sheets-Sheet 4

July 25, 1939.  E. A. BESSOM  2,166,936

MACHINE FOR SHAPING UPPERS OVER LASTS

Filed Aug. 23, 1938  12 Sheets-Sheet 5

INVENTOR:
Earl A. Bessom
by his attorney
Frederick L. Edmonds

July 25, 1939.  E. A. BESSOM  2,166,936
MACHINE FOR SHAPING UPPERS OVER LASTS
Filed Aug. 23, 1938  12 Sheets-Sheet 6

INVENTOR:
Earl A. Bessom
by his attorney
Frederick L. Edmunds

July 25, 1939.  E. A. BESSOM  2,166,936
MACHINE FOR SHAPING UPPERS OVER LASTS
Filed Aug. 23, 1938  12 Sheets-Sheet 7

July 25, 1939.　　　　　E. A. BESSOM　　　　　2,166,936
MACHINE FOR SHAPING UPPERS OVER LASTS
Filed Aug. 23, 1938　　　12 Sheets-Sheet 8

INVENTOR:
Earl A. Bessom
by his attorney
Frederick L. Emmons

July 25, 1939. E. A. BESSOM 2,166,936
MACHINE FOR SHAPING UPPERS OVER LASTS
Filed Aug. 23, 1938 12 Sheets-Sheet 9

INVENTOR:
Earl A. Bessom
by his attorney
Frederick L. Edmonds

July 25, 1939.  E. A. BESSOM  2,166,936
MACHINE FOR SHAPING UPPERS OVER LASTS
Filed Aug. 23, 1938  12 Sheets-Sheet 10

Fig. 21.

INVENTOR:
Earl A. Bessom
by his Attorney
Frederick L. Edmunds

July 25, 1939.  E. A. BESSOM  2,166,936
MACHINE FOR SHAPING UPPERS OVER LASTS
Filed Aug. 23, 1938  12 Sheets-Sheet 11

INVENTOR:
Earl A. Bessom
by his attorney
Frederick L. Edmunds

July 25, 1939.    E. A. BESSOM    2,166,936
MACHINE FOR SHAPING UPPERS OVER LASTS
Filed Aug. 23, 1938    12 Sheets-Sheet 12

Patented July 25, 1939

2,166,936

UNITED STATES PATENT OFFICE 2,166,936

MACHINE FOR SHAPING UPPERS OVER LASTS

Earl A. Bessom, Meadville, Pa., assignor to United Shoe Machinery Corporation, Paterson, N. J., a corporation of New Jersey Application August 23, 1938, Serial No. 226,317

23 Claims. (Cl. 12—7)

The present invention relates to machines for shaping uppers over lasts and is herein illustrated as embodied in a bed lasting machine of the same general type as that disclosed in United States Letters Patent No. 1,018,477, granted February 27, 1912, on an application of Matthias Brock. The end-lasting devices of the illustrated machine are substantially the same as the end-lasting devices of the machine illustrated and described in an application for United States Letters Patent Serial No. 92,816, filed July 27, 1936, in the name of Charles E. Hood. The machine of the Hood application and the machine herein illustrated are particularly adapted to operate on uppers provided with outturned outsole-attaching margins such, for example, as prewelted uppers, but it is to be understood that the invention is not limited in its scope to machines for operating on such shoes, the invention in its broadest aspect being applicable to machines for operating on uppers generally.

It is an object of the present invention to provide in a machine of the type above referred to mechanism for shaping the side portions of shoe uppers over lasts, which mechanism is readily adaptable to operate on uppers of all sizes and is constructed to permit the operator to control the side-lasting operation and to apply to either the ball or the shank portion of the upper as much or as little stretching as in the operator's judgment the shoe being operated upon requires.

With the above and other objects in view a feature of the invention consists in the combination with end-lasting devices including wiper plates such as are commonly provided in bed lasting machines, of a plurality of grippers for shaping the side portions of an upper, said grippers being constructed and arranged to engage an outwardly extending portion of the upper and being individually operable to tension the upper heightwise thereof to an extent determinable by the operator and to work the upper inwardly against the periphery of the last. A further feature of the invention consists in the provision, in a machine for shaping uppers over lasts, of a gripper comprising a pair of upper-engaging jaws, an actuator herein illustrated as a manually operated lever for first closing the jaws on the upper, for them imparting to the gripper a movement of translation heightwise of the upper thereby to stretch the upper over a last, and for finally imparting to the gripper a movement of translation widthwise of the upper to work the upper in against the periphery of the last, and means for holding the gripper closed after the operation of the actuator has been completed. In the illustrated machine there are four such grippers, one at each side of the ball portion of the shoe and one at each side of the shank portion. The illustrated organization of each of the grippers includes a carrier for the gripper jaws which consists of a rocker and a slide mounted therein. The operation of the slide imparts to the gripper jaws their movement of translation heightwise of the upper while the operation of the rocker imparts to the gripper jaws their movement of translation widthwise of the upper. In accordance with a feature of the invention the means whereby the actuator operates the slide is rendered inoperative to permit the actuator to operate the rocker without further operating the slide.

Another feature of the invention consists in the combination with a gripper which is manually operated to tension the upper heightwise of the last and to work the upper widthwise thereof against the periphery of the last, of power-operated means for opening the gripper. In the illustrated machine said gripper-opening means is operated by connections from the usual cam shaft, which connections also operate to release the gripper-carrying slide and the rocker in which the slide is mounted and permit them to return to their rest positions. The completely lasted shoe may then be removed from the machine.

In order to afford provision for adjustment of the grippers lengthwise of a shoe in the machine, a further feature of the invention consists in the provision in a machine for shaping uppers over lasts of a plurality of shafts each of which, as herein illustrated, carries two grippers, and means for rocking said shafts to adjust the grippers lengthwise of the shoe to position them to operate on shoes of different sizes. The illustrated adjusting mechanism rocks said shafts to varying extents, thereby to adjust said gripper not only toward and from the toe end of the shoe but also toward and from each other in order that the point of operation of each gripper relatively to the shoe may be the same on shoes of any and all sizes. In accordance with a further feature of the invention, the machine is provided with means which may be used to rock only one of said shafts, thereby to adjust the grippers mounted on said shaft lengthwise of the shoe. This latter adjustment is employed when it is desired to vary the point of operation of one of the grippers at each side of the shoe lengthwise of the shoe. Ordinarily this would be desirable only when a change is made in the type of work being operated upon. It might, for example, be desirable when changing from men's work to women's work.

These and other features of the invention will now be described with reference to the accompanying drawings and will be pointed out in the appended claims.

This invention is herein illustrated as embodied in a machine of the general type disclosed in the Brock patent above referred to. The illustrated machine is provided with mechanism for shaping the forepart of an upper over a last similar to the mechanism disclosed in the Hood application above referred to, namely, plates 30 and 32 (Fig. 1) which, as herein illustrated, engage respectively the upper and lower surfaces of a welt 34 projecting outwardly from an upper 36 on a last in the machine. The plates 30 are moved downwardly to grip the welt against the plates 32 by the operation of a hand lever 38 which operates the plates 30 which engage the upper or sole-attaching face of the welt. The plates 30 and 32 and the hand lever 38 are mounted in a head 40 on a slide 42 which is mounted for vertical movement in the machine frame 44. The head 40 is moved upwardly after the plates 30 and 32 are closed on the welt 34 to shape the forepart of the upper over the last, such upward movement being effected by operating a double-acting treadle 46 which is connected to the slide 42 by a link 48. During the operation of the treadle 46 the last is held against upward movement by a holddown member 50 which is carried by a slide 52 mounted in an arm 54 swiveled on a post 56, the holddown 50 being movable from a remote position into its operative position illustrated in Fig. 1 by swinging the arm 54 on the post 56. For operating the plates 30 to wipe an insole-attaching portion 58 (Fig. 2) of the welt 34 in over an insole 60 on the last bottom the illustrated machine is provided with a hand lever 62 (Fig. 1) which is substantially the same in its construction and operation as the toe wiper lever disclosed in the Brock patent above referred to. The rear part of the upper 36 is held by a rear-part-embracing band 64 the upper edge face of which is constructed and arranged to support the rear portion of the welt 34, and the machine is provided with hinged wiper plates 66 (Fig. 2) which are operated by a hand lever (not shown) to wipe the rear part of the insole-attaching portion 58 of the welt inwardly over the rear part of the insole.

For working the opposite side portions of the upper upwardly and inwardly against the last after the operations on the end portions of the upper have been completed the illustrated machine is provided with novel welt grippers one of which is illustrated in successive stages in its operation in Figs. 3 to 9, inclusive. The illustrated machine has four welt grippers which are secured to opposite ends of cross shafts 68 and 70 (Fig. 1) which are journaled in bearings in a carriage 72. This carriage is substantially the same in its construction and operation as a corresponding carriage in the machine illustrated in the Brock patent above referred to, in which machine, as also in the machine herein illustrated, said carriage supports and positions the head 76 in which are mounted the rear-part-embracing band 64 and the wiper plates 66. The carriage 72 swings in a horizontal plane about a fulcrum 74 which is located directly beneath the intersection of the longitudinal median line of the forepart and the longitudinal median line of the rear part of a shoe supported in the machine. The carriage 72 is swung on its fulcrum 74 to adjust the operating parts which it carries for operation on right and left shoes.

Figures 3, 4:
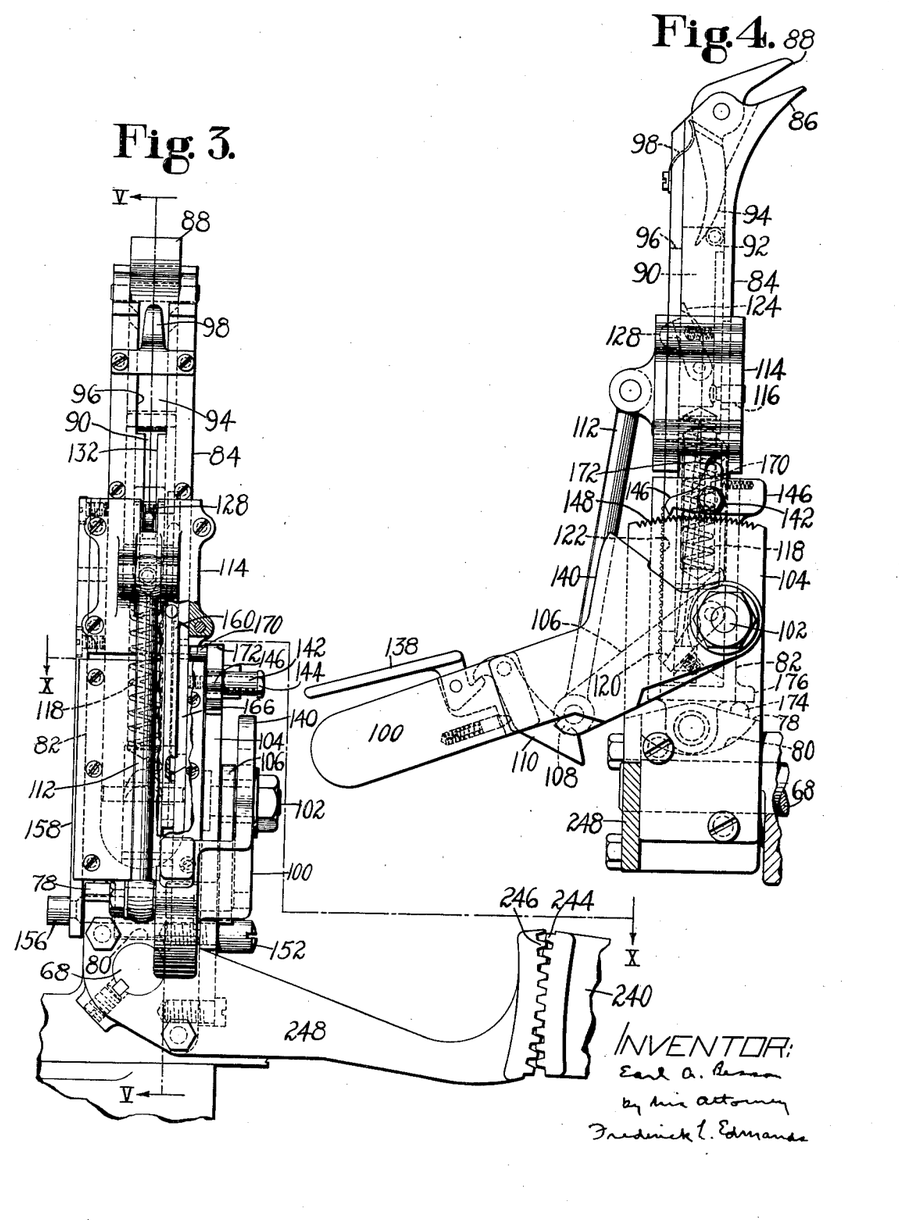
Fig. 3 is a detail view looking widthwise of a shoe in the machine at one of the gripper units.
Fig. 4 is a detail view of the gripper illustrated in Fig. 3 looking toward the toe head of the machine.
Figures 9, 10:
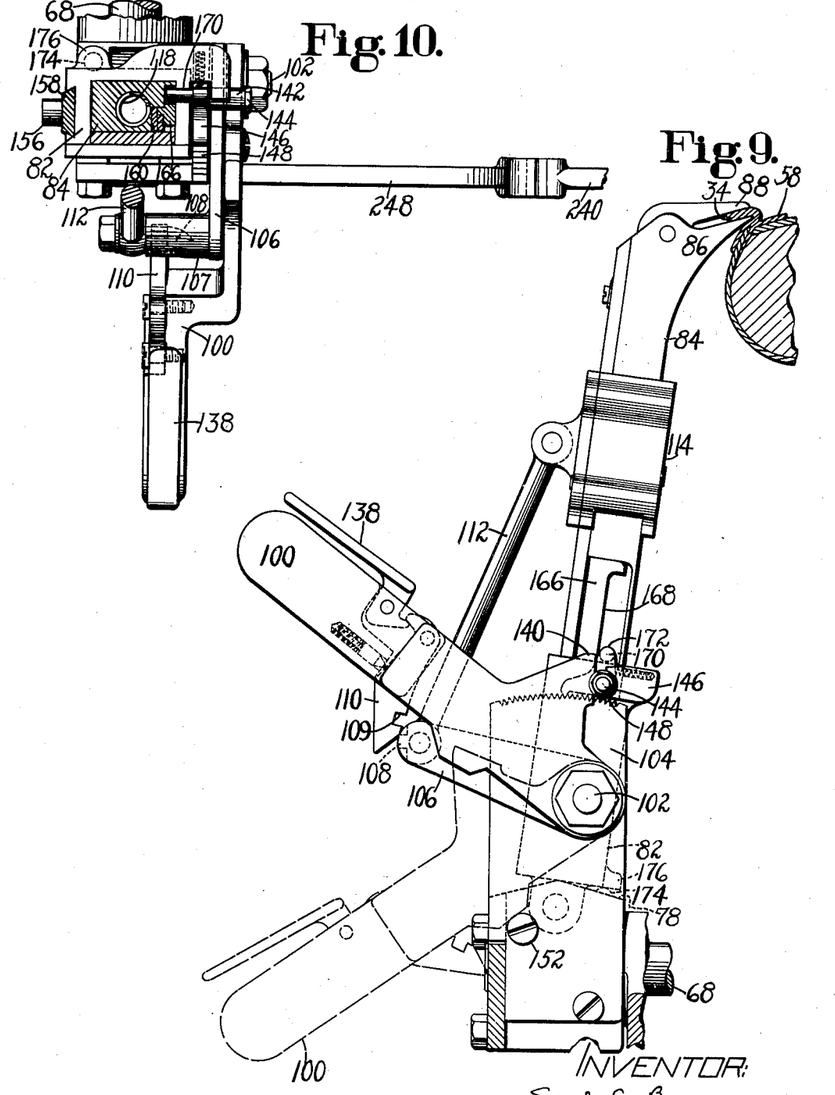
Fig. 9 is a view similar to Fig. 4 showing the gripper at the end of its operation, parts of an upper and a last being shown in section.
Fig. 10 is a sectional plan view taken substantially on the line X—X of Fig. 3.

The four welt grippers are substantially alike in construction and therefore only one gripper will be described in detail. Referring to Figs. 3 and 4 illustrating one of the grippers at the front of the machine, the illustrated welt gripper comprises a base member or block 78 which is secured to one end of the cross shaft 68 and is provided with a groove 80 having an arcuate base as seen in Fig. 4, which groove extends in the same direction as the cross shaft 68. Pivotally mounted in the block 78 between the walls of the groove 80 is a hollow rocker member or carrier 82 within which is slidably mounted a hollow slide 84 which has a lower gripper jaw 86 formed in its upper extremity. As shown in Fig. 10, both the rocker member 82 and the slide 84 are generally rectangular in cross section. Pivotally mounted within the upper extremity of the hollow slide 84 is a movable upper gripper jaw 88 constructed and arranged to cooperate with the gripper jaw 86 to grip the work, for example the welt 34 of the illustrated prewelted upper (Figs. 6 to 9 inclusive). For closing the gripper jaw 88 on the welt a plunger 90 is slidably mounted in the slide 84 and carries at its upper end a roll 92 which operates against an outwardly curved tail 94 extending downwardly from the gripper jaw 88, the slide 84 being provided at its upper end with a notch 96 to provide clearance for the movement of the tail 94 as the gripper closes. For opening the gripper a leaf spring 98 is secured to the slide 84 and extends through the notch 96 and into engagement with the tail 94 of the gripper jaw 88 (Fig. 4). The gripper jaws are closed by two movements of the plunger 90 first by the expansion of a spring 118 and finally by the operation of a hand lever 100 pivoted on a stud 102 projecting outwardly from a plate 104 secured to the block 78. The spring 118 (Fig. 7) is mounted in the hollow slide 84 and confined between the base of the slide and the lower end of the plunger 90. The spring 118 is relatively light and its action does not create any appreciable gripping action of the gripper jaws on the welt but merely swings the upper jaw downwardly until it engages the sole-attaching face of the welt. The final movement of the plunger 90 by the hand lever 100 continues and completes the closing of the gripper jaws. After the gripper jaws have been closed and the operation of the gripper has been completed the hand lever is returned to its initial position illustrated in broken lines in Fig. 9 and the spring 118 holds the gripper jaws closed on the welt by urging the roll 92 upwardly between the tail 94 of the gripper jaw 88 and the inner wall of the slide 84. It will be understood that while the relatively light pressure of the spring 118 is not sufficient to complete the closing of the gripper jaws on the welt, the same pressure applied to the plunger 90 is adequate to cause the roll 92 to be wedged between the tail 94 of the gripper jaw 88 and the inner surface of the slide 84, thereby to hold the upper gripper jaw against opening movement. Referring now to Fig. 4 illustrating the mechanism actuated by the hand lever 100 to complete the closing of the upper gripper jaw 88 on the welt, an arm 106 is pivoted on the stud 102 on which the hand lever is mounted. For connecting the arm 106 to the hand lever a boss 107 (Fig. 10) on the free end of the arm is provided with a tongue 108 (Fig. 9) which enters a corresponding notch 109 in a latch member 110 on the hand lever. The free end of the arm 106 is connected by a link 112 to an outer slide 114 which is mounted on the slide 84. When the gripper jaws are closed on the work the hollow slide 84 is held against downward movement by a detent 120 (Fig. 7) mounted in the lower portion of the slide and arranged to extend through a slot in the outer wall of the slide for engagement with ratchet teeth 122 in the inner surface of the hollow carrier member 82. When the gripper jaws are open the spring 118 is compressed and the plunger 90 is in the position shown in Figs. 5 and 6 and is held against upward movement by a detent 124 carried by the plunger, the upper end face of the detent engaging the upper wall of a V notch 126 (Fig. 7) provided in the hollow slide 84. The detent 124 is released to permit the gripper jaws to be closed on the welt by the upward movement of the outer slide 114 by the hand lever 100, said detent 124 having a rounded extension 128 which enters a notch 130 in the upper portion of the slide 114 and is cammed inwardly by the slide 114 during its upward movement to disengage the detent from the notch 126 in the hollow slide 84. The rounded extension 128 of the detent does not interfere with the upward movement of the detent in the hollow slide 84 since it is offset from the latching faces of the detent and is positioned in a longitudinal slot 132 (Fig. 3) in the slide 84. The outer slide 114 moves upwardly relatively to the hollow slide 84 to release the detent 124 and after the detent has been released the spring 118 expands to swing the upper gripper jaw 88 downwardly against the welt. As the upward movement of the outer slide 114 continues the lower end wall of a longitudinal slot 134 (Fig. 7) in the outer slide engages a stud 116 mounted in the plunger 90 and extending outwardly into the notch 134 and lifts the plunger 90 to complete the closing of the upper gripper jaw 88 on the welt, the stud 116 moving through a longitudinal slot 136 provided in the hollow slide 84. The spring 118 operating against the plunger 90 holds the gripper jaw 88 closed on the welt. After the gripper jaw 88 has closed on the welt an upward movement of translation is imparted to the gripper to stretch the upper over the last and to bring the welt into sole-attaching position, this movement of translation being effected by continued upward movement of the outer slide 114 by the hand lever 100. After the operator has moved the welted margin upwardly as far as he thinks it should go he operates a thumb lever 138 pivotally mounted in the hand lever 100 to disengage the latch member 110 from the arm 106 and continues to lift on the hand lever until an upward extension 140 of said lever (Fig. 4) engages a roll 142 on a stud 144 (Fig. 3) extending outwardly from the hollow rocker member 82 and swings the member 82, together with the entire gripper assembly, inwardly to force the welted margin of the upper in against the side of the last and against the edge face of the insole. This operation is particularly important at the shank portion on the great toe side of the upper where the welted margin of the upper tends to bridge the inwardly curved portion of the last. For holding the gripper assembly at the limit of its inward movement a detent 146 (Fig. 8) is pivotally mounted on the stud 144 and arranged to engage ratchet teeth 148 in the plate 104 secured to the block 78. After the welted margin has been forced inwardly against the last and the insole the hand lever 100 is permitted to return to its rest position illustrated in broken lines in Fig. 9. In this position the hand lever is supported by the head 152 of one of the screws which secures the plate 104 to the block 78.

Figures 7, 8:
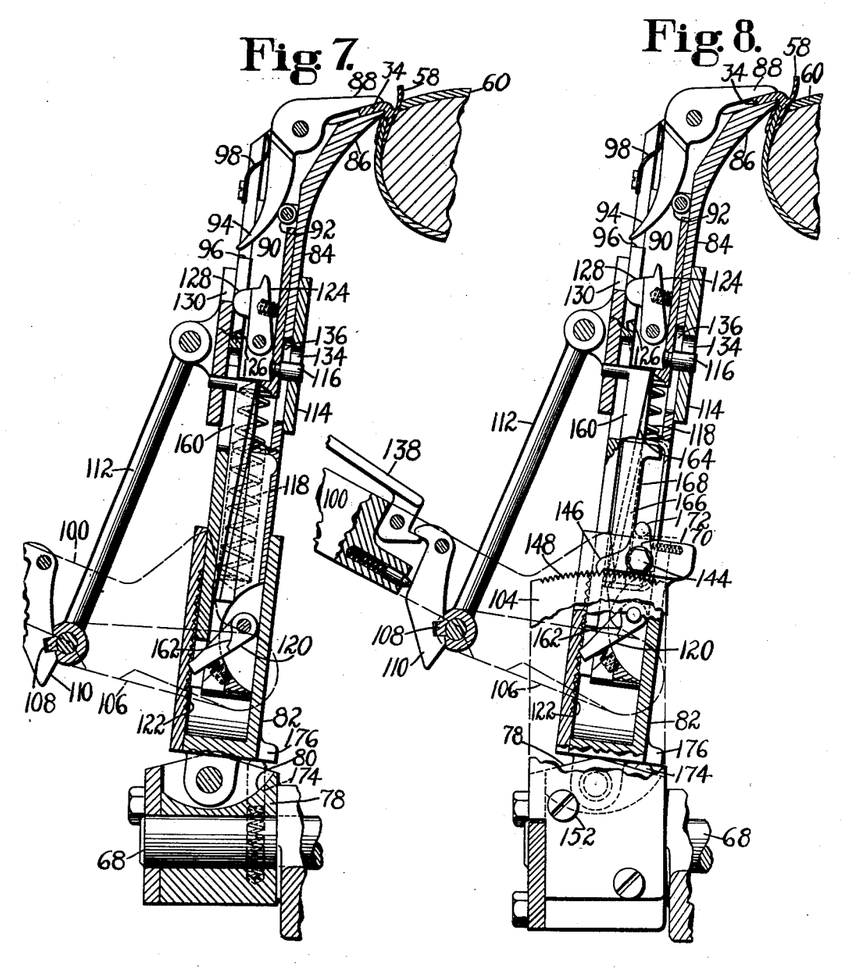
Figure 21:
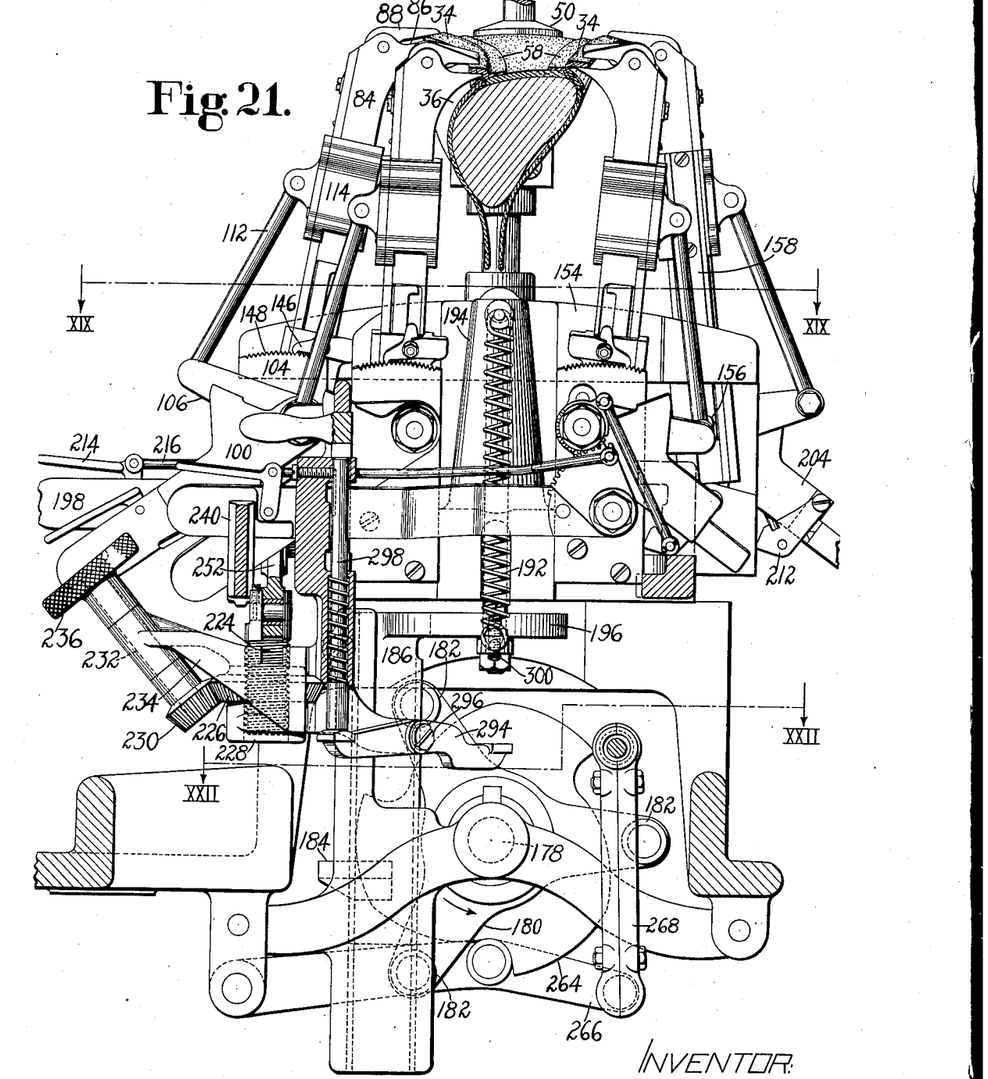
Fig. 21 is a sectional elevation taken substantially on the line XXI—XXI of Fig. 2.

For releasing the gripper jaws and resetting the gripper-operating mechanism the machine is provided with a crosshead 154 (Fig. 21) which is moved downwardly by power-operated mechanism hereinafter described and in the course of its downward movement engages a stud 156 (Figs. 3 and 10) projecting outwardly from a downward extension 158 of the outer slide 114 (Fig. 8) and the upper end wall of the slot 134 in said slide engages the stud 116 in the plunger 90 and draws the plunger downwardly until the detent 124 enters the notch 126 in the slide 84 and holds the plunger against upward movement. For releasing the detent 120 which holds the gripper against downward movement the outer slide 114 carries a cam member or bar 160 which extends downwardly from the slide 114 and lies against the inner wall of the hollow slide 84. As the slide moves downwardly the lower end of the bar 160 engages a cam face in a boss 162 on the detent 120 and swings the detent downwardly, disengaging it from the ratchet teeth 122 and permitting the return of the slide 84 to its lower position illustrated in Fig. 5 in which it rests on the bottom of the rocker member 82. For releasing the detent 146 which holds the gripper against outward movement away from the upper the bar 160 is provided with a diagonal groove 164 (Figs. 5 and 8) which receives a diagonal tongue extending from top to bottom of a transverse slide 166 mounted in the hollow slide 84 and confined therein against movement longitudinally of the slide. During the downward movement of the outer slide 114 the cam member 160 moves the slide 166 to the right, as seen in Fig. 8, and disengages the detent 146 from the ratchet teeth 148 by the engagement of a longitudinal wall or shoulder 168 with a roll 170 on an upward extension 172 of the detent. The gripper assembly is then swung outwardly away from the shoe by a spring-pressed plunger 174 mounted in the block 78 and arranged to engage a lug 176 on the rocker member 82, such outward movement of the gripper assembly being arrested by the engagement of the rocker member with the upper surface of the block 78.

Figure 11:
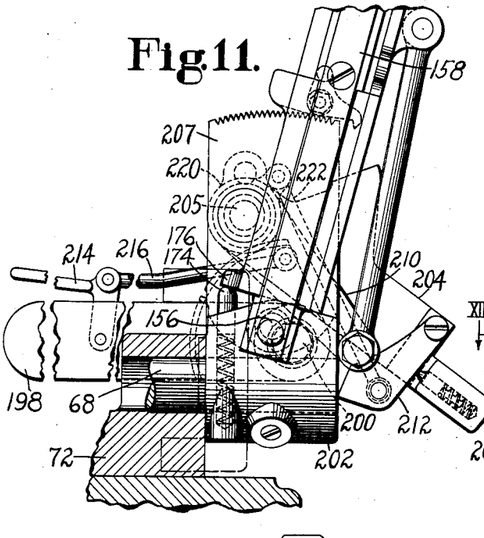
Fig. 11 is a detail elevation looking toward the toe head at the mechanism for operating one of the gripper units at the rear of the machine, certain parts being broken away and the gripper carriage and frame being shown in section.
Figure 12:
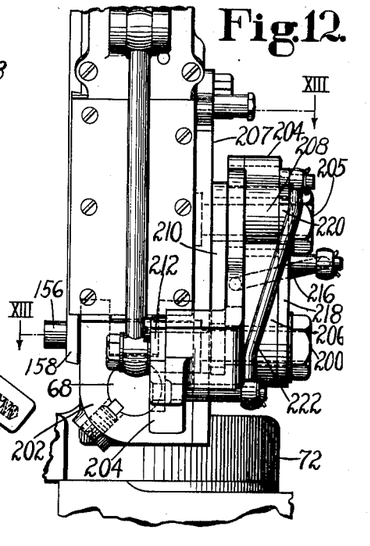
Fig. 12 is a detail view illustrating the mechanism shown in Fig. 11, looking widthwise of a shoe in the machine toward the front of the machine.
Figure 13:
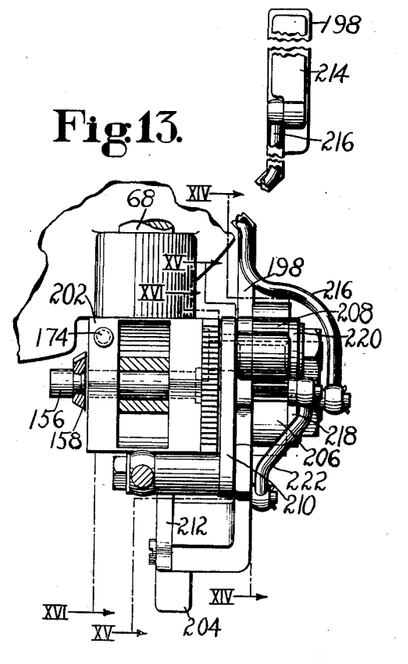
Fig. 13 is a sectional plan view taken substantially on the line XIII—XIII of Fig. 12.
Figure 14:
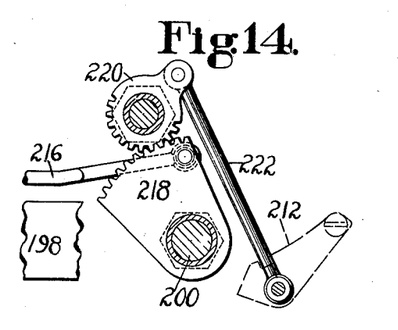
Fig. 14 is a sectional view taken substantially on the line XIV—XIV of Fig. 13.
Figure 15:
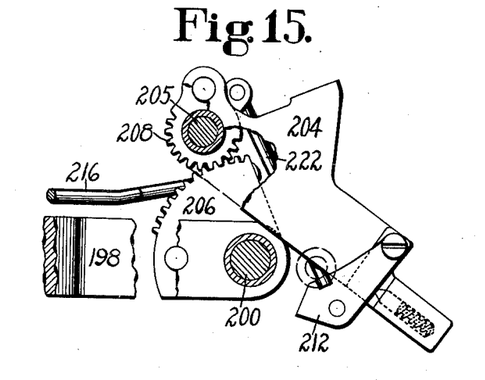
Fig. 15 is a sectional view taken substantially on the line XV—XV of Fig. 13.
Figure 16:
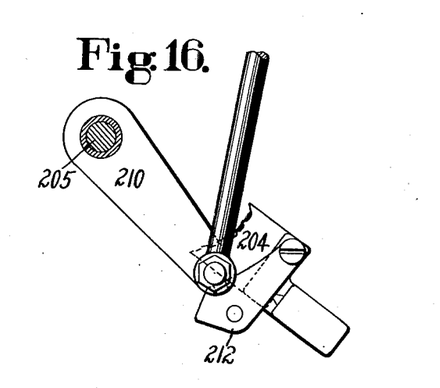
Fig. 16 is a sectional view taken substantially on the line XVI—XVI of Fig. 13.
Figure 19:
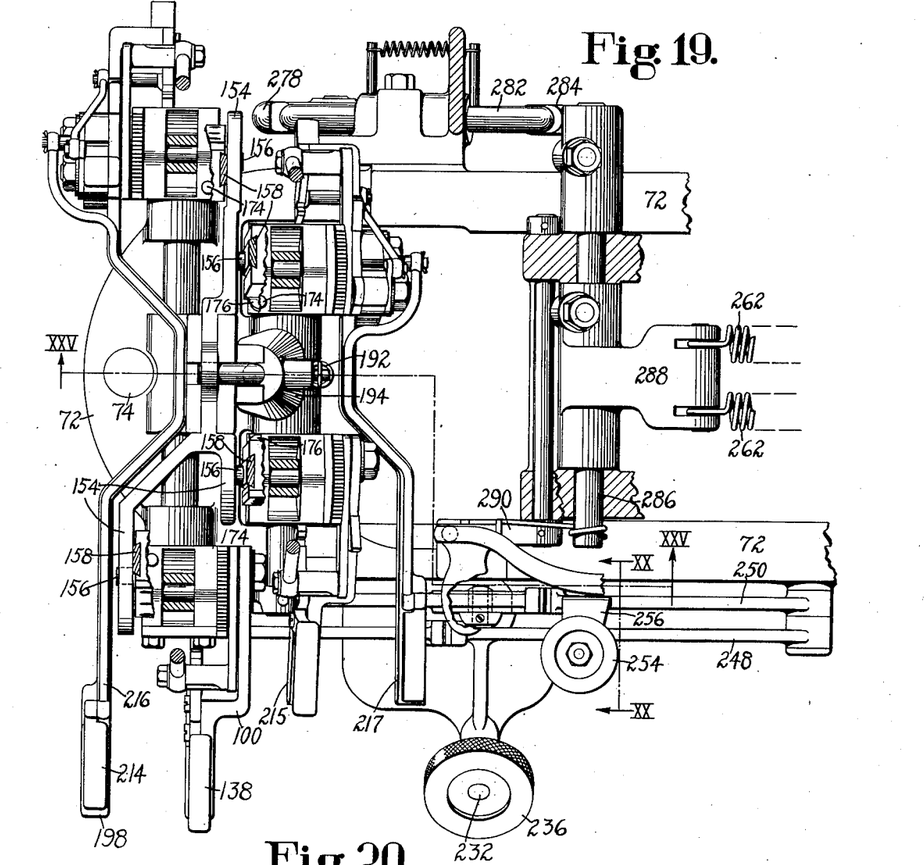
Fig. 19 is a sectional plan view taken substantially on line XIX—XIX of Fig. 21.

The rear grippers are operated by hand levers one of which is illustrated at 198 in Fig. 11. The hand lever 198 is fulcrumed at 200 on a block 202 on the cross shaft 68, which block corresponds to the block 78 illustrated in Fig. 5. The hand lever 198 operates an arm 204 which is fulcrumed at 205 on a plate 207 secured to the block 202. The arm 204 corresponds to the hand lever 100 illustrated in Fig. 9. Referring to Fig. 15, the hand lever 198 is operatively connected to the arm 204 by a gear segment 206 arranged to mesh with gear teeth 208 formed in the hub of the arm 204. The arm 204 operates an arm 210 (Fig. 16) which is fulcrumed together with the arm 204 at 205 on the plate 207. The arm 210 corresponds to the arm 106 illustrated in Fig. 9, being connected to the arm 204 by a detent 212. For disengaging the detent from the arm 210 to permit the arm 204 to swing the gripper toward the periphery of the last, an L-shaped thumb lever 214 (Fig. 11) is pivoted at the end of its short arm to the hand lever 198 and has pivoted at its elbow a link 216 the rear end of which is pivoted to a gear segment 218 (Fig. 14) which is pivoted on the hub of the hand lever 198 and meshes with a gear 220 fulcrumed on the hub of the arm 204. A link 222 connects an extension of the gear 220 to the detent 212 and operates to release the detent when the thumb lever 214 is depressed. Referring to Fig. 19, the hand levers 100 and 198 and hand levers 215 and 217 for operating the two rear grippers extend forwardly of the machine into positions in which they are easily accessible to the operator and the ratio of the gearing connecting the hand lever 198 to the arm 204 is such that the upward movement of the hand levers 198 required to operate the rear grippers is substantially the same as the upward movement of the hand levers 100 for operating the forward grippers.

Figures 22, 23:
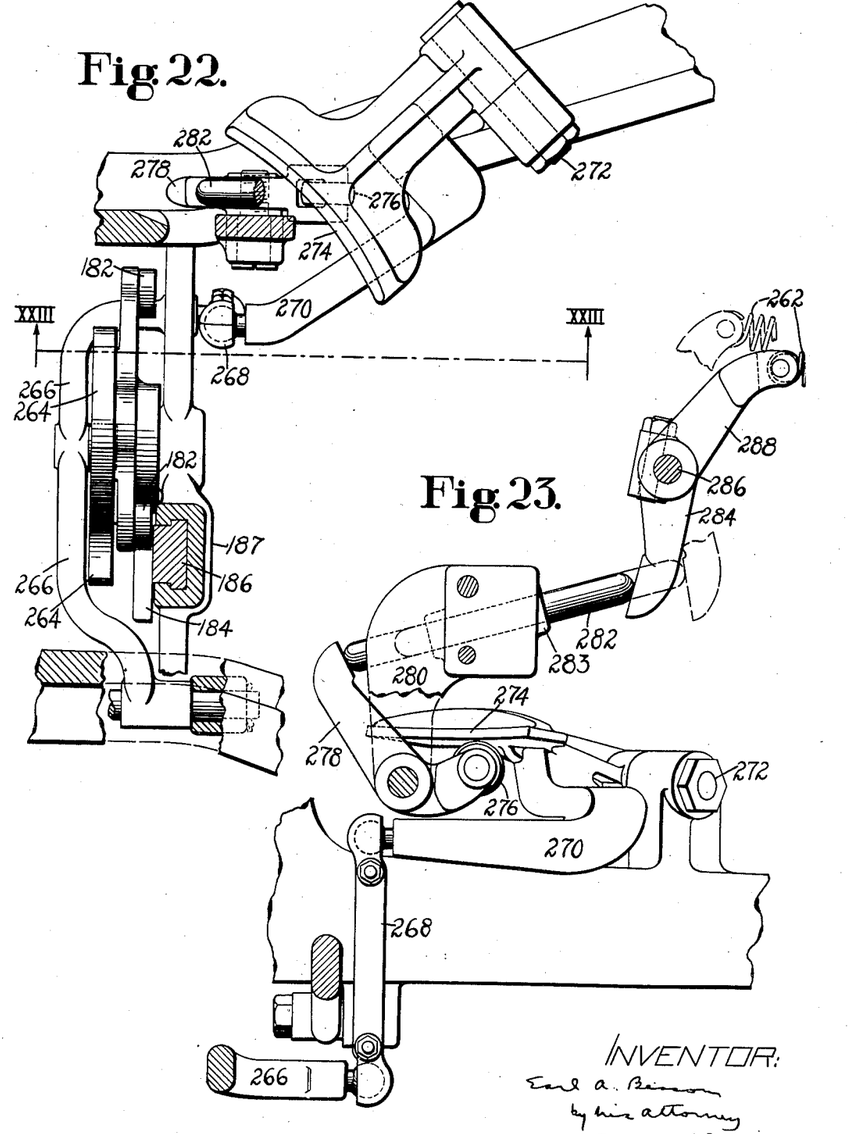
Fig. 22 is a sectional plan view taken substantially on the line XXII—XXII of Fig. 21.
Fig. 23 is a sectional elevation taken substantially on the line XXIII—XXIII of Fig. 22.
Figure 24:
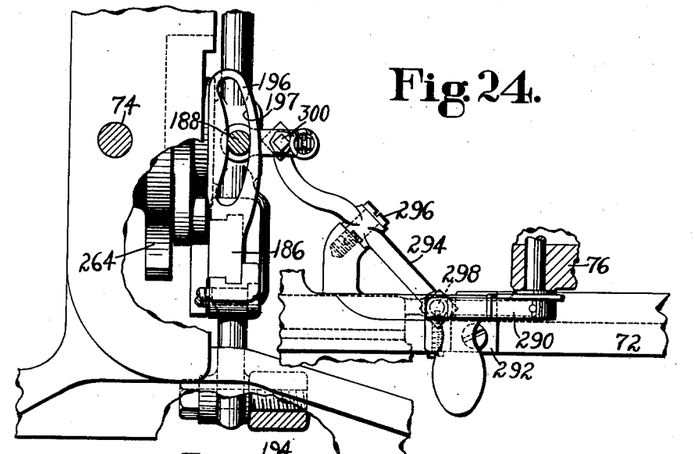
Fig. 24 is a sectional plan view taken substantially on the line XXIV—XXIV of Fig. 25.

In order that the crosshead 154 (Fig. 19) may simultaneously release all four grippers and simultaneously reset the respective gripper-operating mechanisms for a repetition of the operation of the machine, said crosshead is so constructed and arranged that it engages all four of the studs 156 provided in the respective gripper assemblies during its downward movement. The crosshead 154 is operated by a power-operated cam shaft 178 (Fig. 21) which is common to machines of this type. In the operation of the machine the cam shaft turns 60° to jack the shoe in the machine and to bring the rear-part-embracing band into gripping engagement with the shoe. After the manual operatons on the shoe have been completed the operator again starts the cam shaft 178 which turns another 60° to retract the rear-part-embracing band and to move the heel head away from the toe head to permit the shoe to be lifted off the work supports. During the latter movement of the shaft 178 the crosshead 154 is moved downwardly to open the welt-engaging grippers and return them to their rest positions. Since in the course of the operation of the machine the cam shaft 178 turns 120° or one-third of a complete revolution, it is necessary to make provision for three cycles of the machine for each complete revolution of the cam shaft. Accordingly, for operating the crosshead 154 the cam shaft carries a three-armed member or spider 180 which carries at the outer ends of its arms rolls 182 which engage a lug 184 on a vertical slide 186 which travels in a T-way (Fig. 22) provided in a crosshead 187 in the machine frame. During the initial movement of the cam shaft one of the rolls 182 on the spider is positioned adjacent to the lug 184 on the slide 186 and during the final movement of the cam shaft 178 said roll 182 moves downwardly, carrying the slide 186 with it and operating the crosshead 154. Referring to Fig. 24, the slide 186 has a lateral extension 196 which is provided with an arcuate groove 197 which has its center of curvature at the fulcrum 74 on which swings the carriage 72. An upward extension 194 (Fig. 25) of the carriage has slidably mounted therein a vertical rod 188 which extends through the slot 197 and provides a connection from the slide 186 to the crosshead 154, the upper end of the rod 188 being connected to the crosshead by a stud 190 which extends through a hole in the crosshead. The crosshead moves up and down between the walls of a guideway 199 formed in the upward extension 194 of the carriage 72 and is maintained by the walls 199 in position to engage the studs 156 which project from the slides 158 of the gripper assemblies into the path of movement of the crosshead.

Figure 17:
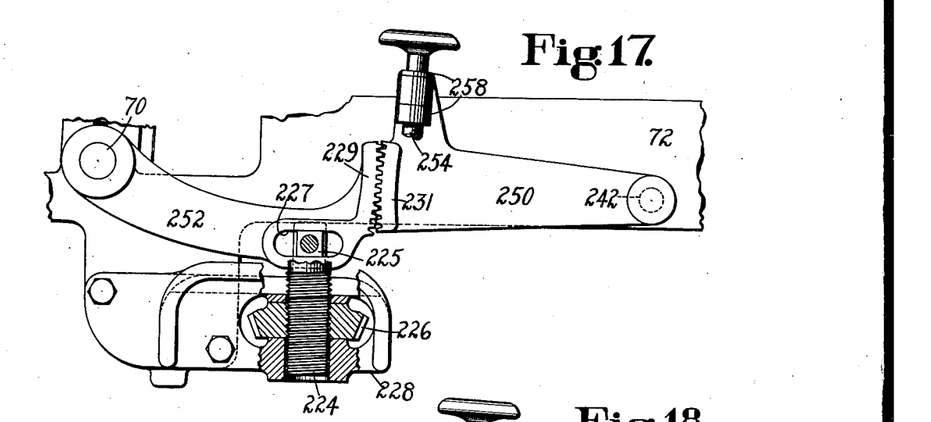
Fig. 17 is a detail view in front elevation, partly in section, illustrating the mechanism for adjusting the grippers.
Figure 18:
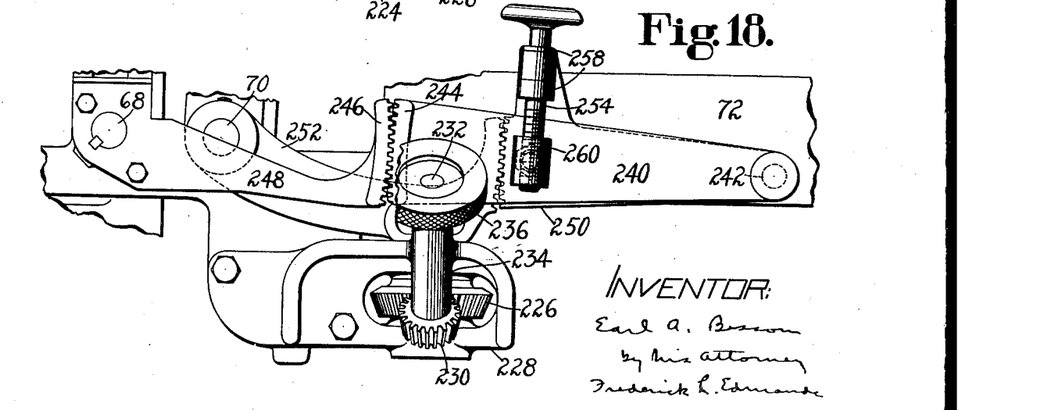
Fig. 18 is a detail view in front elevation illustrating particularly certain parts of the gripper-adjusting mechanism not shown in Fig. 17.
Figure 20:
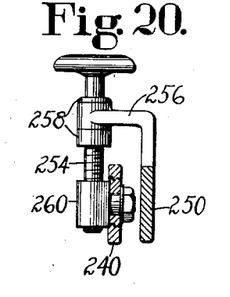
Fig. 20 is a detail sectional view taken substantially on line XX—XX of Fig. 19.

For adjusting the grippers longitudinally of a shoe in the machine for operation on different sizes of shoes means is provided for rocking the shafts 68 and 70 (Fig. 1) to change the positions of the grippers. The shaft 70 is rocked slightly more than the shaft 68 in order that the grippers nearest the heel end of the shoe will approach the other grippers as the grippers are adjusted toward the toe end of a shoe in the machine and conversely the grippers nearest the heel end of the shoe will move away from the other grippers as the grippers are adjusted toward the heel end of a shoe in the machine. This differential movement of the shaft 70 relatively to the shaft 68 automatically locates the grippers in like positions lengthwise of the shoe relatively to any and all sizes of shoes. In the illustrated machine the adjustment of the shafts 68 and 70 is effected by vertical movement of a screw 224 (Fig. 17) mounted in an internally threaded bevel gear 226 positioned in a horizontal opening in a forward extension 228 of the carriage 72 and held against vertical movement between plane surfaces defining the top and bottom of said opening. For operating the bevel gear 226 a bevel gear 230 (Fig. 18) is secured to a short shaft 232 which is journaled in a bearing in an arm 234 (Fig. 21) projecting forwardly from the extension 228 and is provided at its upper end with a handle 236. The screw 224 carries a swivel block 225 (Fig. 17) which is slidably mounted in a horizontal slot 227 in the free end portion of an arm 252 secured to the cross shaft 70 which carries the gripper members nearest the rear portion of the shoe. The arm 252 has a gear segment 229 at its free end which meshes with a gear segment 231 on an arm 250 which is fulcrumed at 242 on the carriage 72. Another arm 240 (Fig. 18) also fulcrumed at 242 is adjustably connected to the arm 250 by means hereinafter described and has a gear segment 244 at its free end which meshes with a gear segment 246 at the free end of an arm 248 which is secured to the rock shaft 68 which carries the gripper units nearest the toe end of the shoe. For causing the arm 240 to swing with the arm 250 said arms are connected together by mechanism illustrated in Figs. 18 and 20 comprising a screw 254 mounted in a bearing in a forward extension 256 (Fig. 20) of the arm 250 and held against vertical movement by collars 258 on said screw. The screw extends through a tapped hole in a block 260 swiveled on the arm 240. In the normal operation of the machine the screw 254 merely provides a fixed connection between the arm 250 and the arm 240, but it will be understood that the screw also provides means for moving the arm 240 upwardly or downwardly relatively to the arm 250 thereby to adjust the grippers nearest the toe end of the shoe toward or from the other grippers without changing the position of the latter.

Figure 25:
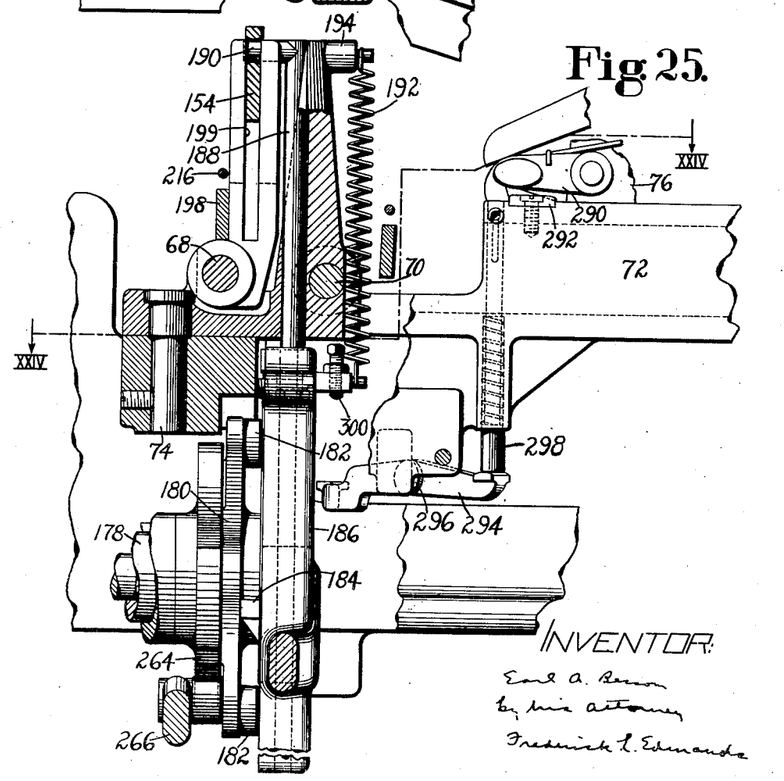
Fig. 25 is a sectional elevation taken substantially on the line XXV—XXV of Fig. 19.

In machines of the type herein illustrated, the heel head is usually mounted on the heel carriage for movement away from the rear part of a shoe in the machine to facilitate the removal of the shoe after the lasting operations have been completed. For effecting such movement of the heel head, machines of this type are commonly provided with springs which are automatically energized during the operation of the machine and operate against the heel head after the heel head is automatically unlatched from the heel carriage. In the illustrated machine said springs are mounted in the heel head itself, the forward portion of one of said springs being illustrated at 262 in Fig. 23. For energizing or tensioning the springs 262 a discoidal cam member 264 (Fig. 21) is fixed to the cam shaft 178 and operates a bent lever 266 (Fig. 22) which is connected by a link 268 to a bent lever 270 (Figs. 22 and 23) which is fulcrumed at 272 on the machine frame and has a wide end portion 274 in the form of an arc struck from the fulcrum on which the carriage 72 swings. The end portion 274 of said lever operates against a roll 276 (Fig. 23) at one end of a bell crank lever 278 pivotally mounted on a downwardly extending arm 280 of the carriage 72. The upper end of the bell crank lever engages one end of a slide rod 282 mounted in a bearing in a boss 283 on the arm 280. The other end of the slide rod engages the lower portion of an arm 284 secured to a cross shaft 286 in the heel head to which there is also secured an arm 288 to which is anchored two springs 262 which move the heel head away from the shoe. Referring to Figs. 24 and 25, the heel head 76 is retained in its operative position by a latch member 290 pivoted to a forward extension of its base portion and arranged to engage a latch plate 292 on the carriage 72. For lifting the latch member 290 to permit the springs 262 to move the heel head into its remote position, a horizontal rocker arm 294 (Fig. 25) is fulcrumed at 296 on a downward extension of the carriage 72 and is arranged to lift a vertical plunger 298 mounted in the carriage 72 and arranged to lift the latch member 290. The rocker arm is operated by the slide 186 during the latter part of its downward movement as a pin 300 projecting from the slide engages one end of the rocker arm 294 and swings it in a counterclockwise direction, as seen in Fig. 25, to lift the plunger 298.

Figure 1:
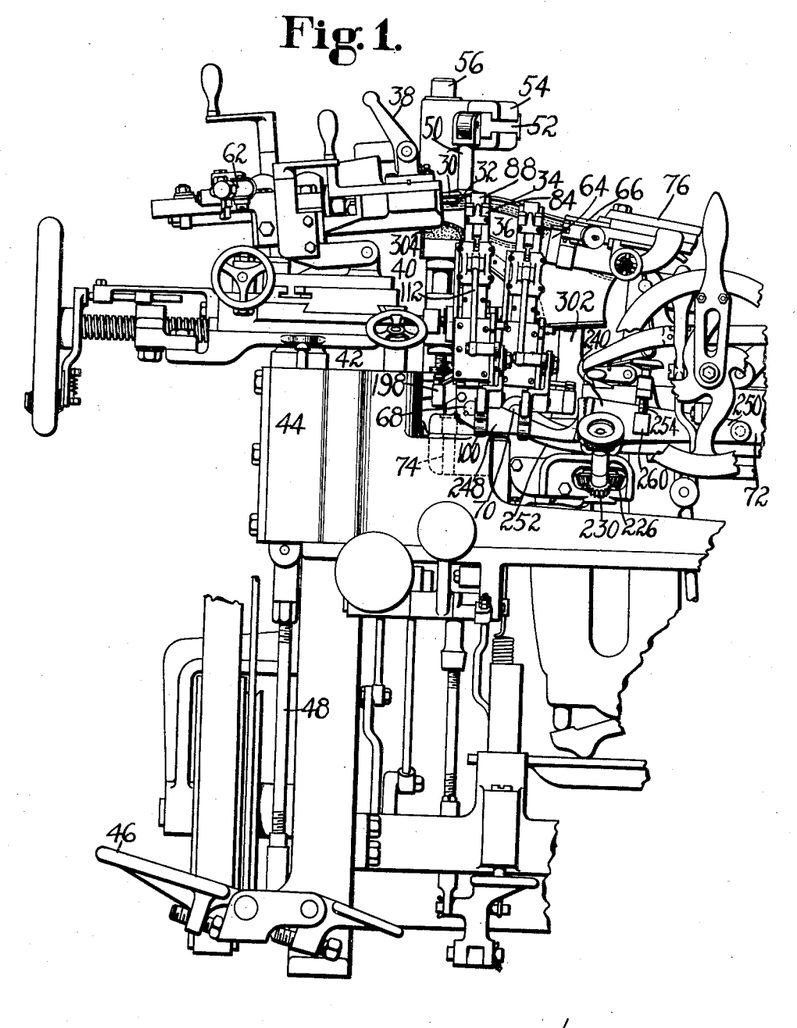
Fig. 1 is a front elevation of a bed lasting machine embodying the features of the present invention, part of the heel end of the machine being broken away.
Figure 2:
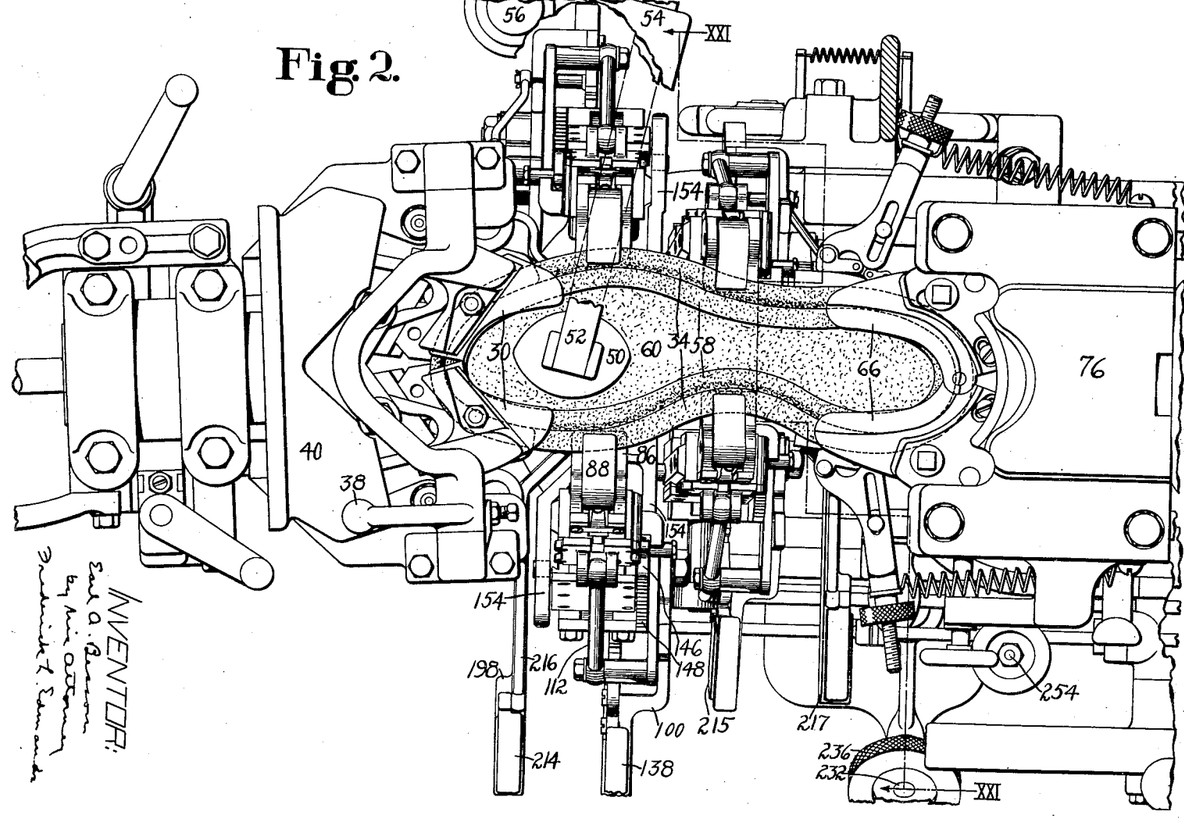
Fig. 2 is a plan view of the machine with parts of both ends broken away and certain other parts broken away to show underlying parts.
Figures 5, 6:
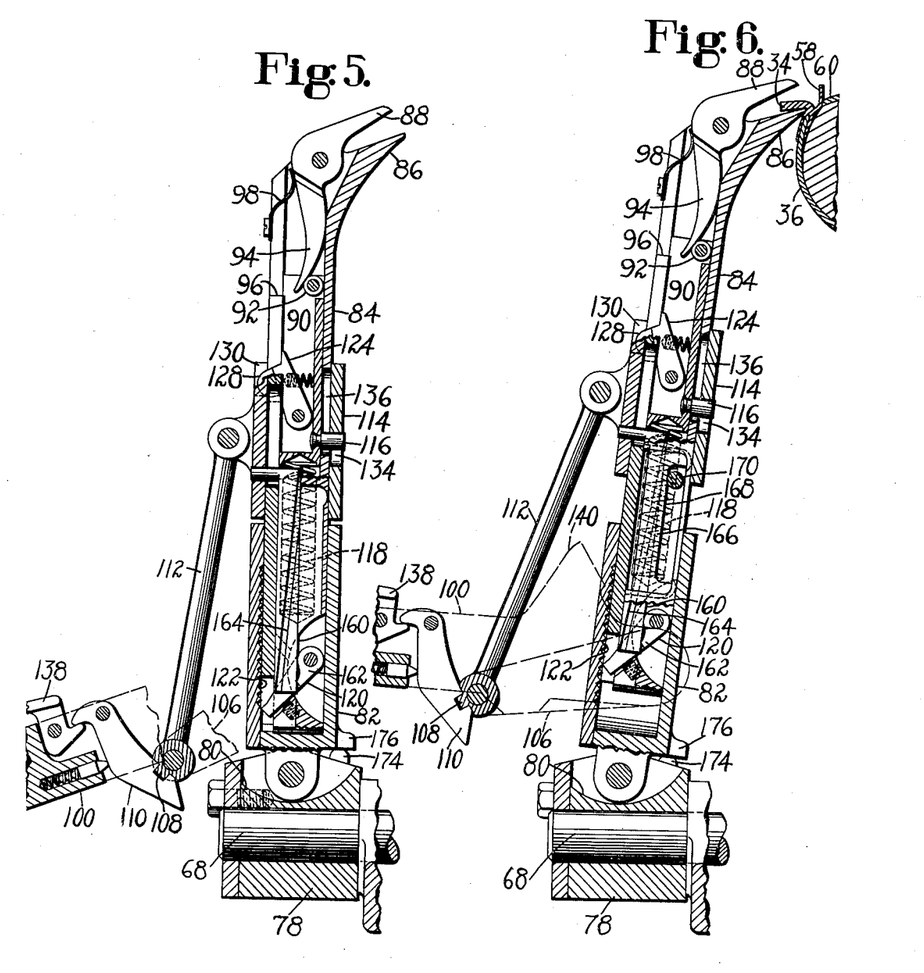
Fig. 5 is a sectional view taken substantially on the line V—V of Fig. 3.
Figs. 6, 7 and 8 are sectional views similar to Fig. 5 showing the gripper at successive stages in its operation, parts of an upper and a last being shown in section.

In the preferred operation of the machine a prewelted upper, for example the upper 36 illustrated in Fig. 1 is assembled on a suitable last, and the last with the upper thereon is mounted on the heel post 302 and toe rest 304 of the illustrated machine. When the upper on its last is mounted in the machine the outsole-attaching flange 34 extends outwardly from the upper (Fig. 6) in position to be engaged by the welt-engaging plates at opposite ends of the shoe and by the welt-engaging grippers at opposite sides of the shoe. After the upper on its last is mounted in the machine the shoe is jacked in the machine by power, then the hand lever 38 (Fig. 1) is operated to bring the wiper plates 30 into engagement with the outsole-attaching flange 34 of the welt and clamp it against the plates 32, whereupon the treadle 46 is operated to move the toe head 40 upwardly to stretch the toe end of the upper over the last. The hand lever 62 is then operated to advance the wiper plates 30 into their position illustrated in Fig. 2, thereby wiping the insole-attaching flange 58 over the toe portion of the insole 60, said flange having previously been treated with cement for attachment to the insole which also has an application of cement thereon. The heel-seat-lasting wipers 66 are then advanced into their position in Fig. 2 to wipe the rear portion of the insole-attaching flange 58 over the heel seat portion of the insole. While the wipers 30 and 66 remain in their advanced positions illustrated in Fig. 2 the upper at opposite sides of the shoe is stretched over the last by means of the welt-engaging grippers. The grippers may be operated in series or in pairs, as desired. In most cases it is preferable to operate simultaneously the grippers at opposite sides of the forepart and then, while the forepart is held in position, to operate simultaneously the grippers at opposite sides of the shank. It will be understood that each gripper may be operated independently of the other grippers and consequently the upper at either side of the shank or the forepart may be further stretched without changing the position of any other part of the upper. In the operation of each of the respective grippers the gripper unit is first swung inwardly against the side of the upper by the operation of its hand lever. After the inward swinging movement of the gripper unit is arrested by the engagement of the lower gripper jaw 86 with the upper, further operation of the hand lever causes said lever to swing about its fulcrum, lifting the slide 84 until the lower gripper jaw 86 engages the welt as shown in Fig. 6. During this initial upward movement of the slide 84 the outer slide 114 operated by the hand lever acts against the latch member 124. As the upward movement of the slide is resisted by the engagement of the lower gripper jaw 86 with the welt, continued upward movement of the hand lever causes the slide 114 to cam the latch member 124 inwardly, whereupon the spring 118 lifts the plunger 90 and swings the upper gripper jaw downwardly against the welt. Further upward movement of the hand lever further closes the upper gripper jaw and grips the welt against the lower jaw 86. As the welt resists further closing of the jaws the continued upward movement of the hand lever produces a movement of translation of the slide 84 and all the parts carried thereby, advancing the gripper from its position in Fig. 7 to its position in Fig. 8, thus stretching the upper heightwise of the last. The operator then depresses the thumb lever 138 to disengage the hand lever 100 from the arm 106. Then the hand lever is further lifted, bringing its extension 140 into engagement with the stud 144 (Fig. 9) in the hollow rocker member 82 of the gripper unit. As the upward movement of the hand lever continues thereafter the gripper is swung inwardly, thereby working the welted margin of the upper inwardly against the last and against the edge face of the insole. After the operator has stretched the side portions of the upper over the last and worked the welted margin of the upper inwardly against the periphery of the last to his satisfaction he wipes the insole-attaching flange 58 (Fig. 2) of the welt over the insole 60 with his fingers and secures it to the side margins of the insole by cement or by fastenings or by both cement and fastenings. The operator then retracts the toe-lasting wiper plates 30 and the heel-lasting wiper plates 66 and finally depresses the clutch treadle to cause the cam shaft to complete its cycle of operations. As usual in machines of this type, this final movement of the cam shaft unjacks the shoe, releases the rear-part-embracing band and unlatches the heel head from its carriage to permit the heel head to be moved away from the shoe by mechanism hereinbefore described. The final movement of the cam shaft also moves the crosshead 154 (Fig. 21) downwardly to open the grippers and return them to their respective rest positions. The completely lasted shoe is then free to be lifted from the work supports.

Having thus described my invention, what I claim as new and desire to secure by Letters Patent of the United States is:

1. In a machine for shaping uppers over lasts, the combination with end-lasting wiper plates, of a plurality of grippers for shaping the side portions of the upper, said grippers being constructed and arranged to engage an outwardly extending portion of the upper and being individually operable to tension the upper heightwise thereof to an extent determinable by the operator and to work the upper inwardly against the periphery of the last.

2. In a machine for shaping uppers over lasts, the combination with end-lasting wiper plates, of forepart grippers and shank grippers for shaping the upper over a last, and manually operated means for operating each of said grippers separately from the others.

3. In a machine for shaping uppers over lasts, a gripper comprising a pair of upper-engaging jaws, an actuator for first closing the jaws on the upper, then imparting to the gripper a movement of translation heightwise of the upper to stretch the upper over a last and finally imparting to the gripper a movement of translation widthwise of the upper to work the upper in against the periphery of the last, and means for holding the gripper closed after the operation of the actuator has been completed.

4. In a machine for shaping uppers over lasts, a gripper comprising a pair of upper-engaging jaws, a slide which carries said jaws, a plunger movable longitudinally of the slide to close the gripper jaws, an operating member movable longitudinally of the slide, said member being constructed and arranged to actuate said plunger, a rocker in which the slide is mounted, a hand lever, means whereby the lever operates said member, means whereby the lever swings the rocker, and means for rendering the lever inoperative on said member before it operates the rocker.

5. In a machine for shaping uppers over lasts, the combination with means for supporting an upper on a last in inverted position, of a gripper mounted below the level of the last, said gripper comprising a pair of upper-engaging jaws, a slide which carries said jaws, a rocker in which the slide is mounted, an actuator, means operated by the actuator for closing the jaws and moving the slide upwardly to stretch the upper over the last, and means on which the actuator operates to swing the rocker in a direction to move the gripper toward the periphery of the last.

6. In a machine for shaping uppers over lasts, the combination with means for supporting an upper on a last in inverted position, of a gripper mounted below the level of the last, said gripper comprising a pair of upper-engaging jaws, a slide which carries said jaws, a rocker in which the slide is mounted, an operating member mounted on the slide, means on which said member operates to close the gripper jaws and move the slide upwardly to stretch the upper over the last, and an actuator for said operating member.

7. In a machine for shaping uppers over lasts, the combination with means for supporting an upper on a last in inverted position, of a gripper mounted below the level of the last, said gripper comprising a pair of upper-engaging jaws, a slide which carries said jaws, a rocker in which the slide is mounted, an operating member mounted on the slide, means on which said member operates to close the gripper jaws and move the slide upwardly to stretch the upper over the last, an actuator for said operating member, means on which the actuator operates to swing the rocker in a direction to move the gripper toward the periphery of the last, and means for rendering the actuator inoperative on the slide to enable the actuator to operate on the rocker without imparting further upward movement to the slide.

8. In a machine for shaping uppers over lasts, the combination with means for supporting an upper on a last in inverted position, of a gripper mounted below the level of the last, said gripper comprising a pair of upper-engaging jaws, a slide which carries said jaws, a rocker in which the slide is mounted, an operating member mounted on the slide, means on which said member operates to close the gripper jaws and move the slide upwardly to stretch the upper over the last, an actuator for said operating member, means on which the actuator operates to swing the rocker in a direction to move the gripper toward the periphery of the last, and means operable at the will of the operator for rendering said actuator inoperative on the slide.

9. In a machine for shaping uppers over lasts, a gripper comprising a pair of upper-engaging jaws, a slide by which the jaws are carried, a rocker which carries the slide, an actuator, means operated by the actuator for closing the gripper jaws on the upper and moving the slide heightwise of the upper to stretch the upper over a last, means for rendering the actuator inoperative on the slide, and means whereby the actuator operates the rocker to move the gripper toward the periphery of the last, the actuator being inoperative on the rocker until it is rendered inoperative on the slide.

10. In a machine for shaping uppers over lasts, a gripper comprising a pair of upper-engaging jaws, manually operated means for closing the jaws on the upper, moving the gripper heightwise of the upper to stretch the upper over a last and moving the gripper widthwise of the upper to work the upper in against the periphery of the last, and power-operated means for opening the gripper.

11. In a machine for shaping uppers over lasts, a gripper comprising a pair of upper-engaging jaws, manually operated means for closing the jaws on the upper, moving the gripper heightwise of the upper to stretch the upper over a last and moving the gripper widthwise of the upper to work the upper in against the periphery of the last, locking means for holding the gripper at the limit of its heightwise movement, and power-operated means for opening the gripper jaws and rendering the locking means inoperative.

12. In a machine for shaping uppers over lasts, a gripper comprising a pair of upper-engaging jaws, manually operated means for closing the jaws on the upper, moving the gripper heightwise of the upper to stretch the upper over a last and moving the gripper widthwise of the upper to work the upper in against the periphery of the last, locking means for holding the gripper against return movement heightwise of the upper, locking means for holding the gripper against return movement widthwise of the upper, and power-operated means for opening the gripper jaws and rendering both said locking means inoperative.

13. In a shoe machine, a gripper comprising a pair of work-engaging jaws, a member on which one of said jaws is pivoted, a tail on said movable jaw, a member constructed and arranged to operate against said tail to close the gripper jaws on the work, manual means for operating said member, and power-operated means for retracting said member to relax the grip of the jaws on the work.

14. In a shoe machine, a gripper comprising a pair of work-engaging jaws, a slide in which one of said jaws is pivotally mounted, said pivotally mounted jaw having a tail which extends into the slide, an operating member slidably mounted in the slide and constructed and arranged to act against said tail to close the gripper on the work, manually operated means for advancing the operating member to close the gripper on the work, and power-operated means for retracting the operating member to permit the gripper to open.

15. In a machine for shaping uppers over lasts, a plurality of grippers each of which comprises a pair of upper-engaging jaws, a manually operated actuator for each of said grippers, said actuators being independently operable to close each gripper on an upper and to move the gripper in a direction to shape the upper over a last, means for holding the gripper jaws closed on the upper, means for holding each gripper against bodily return movement, and a power-operated member for releasing the means for holding the gripper jaws closed and for releasing the means for holding the grippers against bodily return movement.

16. In a machine for shaping uppers over lasts, a plurality of grippers each of which comprises a pair of upper-engaging jaws, a manually operated actuator for each of said grippers, said actuators being independently operable first to close each gripper on an upper, then to move the gripper heightwise of the upper to stretch the upper over the last, then to move the gripper widthwise of the upper to work the upper in against the periphery of the last, means for holding the gripper jaws closed on the upper, a locking member for holding each gripper against return movement heightwise of the upper, another locking member for holding the gripper against return movement widthwise of the upper, and a power-operated actuator for releasing the means for holding the gripper jaws closed and for unlocking said locking members.

17. In a machine for shaping uppers over lasts, a plurality of grippers each of which comprises a pair of upper-engaging jaws, a member for holding the jaws of each gripper closed on an upper, a latch for holding said member retracted, a manually operated actuator for successively unlatching said member, closing the jaws on the upper, moving the closed gripper heightwise of the upper to stretch the upper over a last and moving the gripper widthwise of the upper to work the upper in against the periphery of the last, a latch for holding the gripper against return movement heightwise of the upper, another latch for holding the gripper against return movement widthwise of the upper, and a power-operated actuator constructed and arranged to operate on each gripper to retract the member which holds the gripper jaws closed and to unlatch the latches which hold the gripper against return movement.

18. In a machine for shaping uppers over lasts, a plurality of upper-engaging grippers, a plurality of shafts each of which carries a gripper at each end, said grippers being arranged to operate at opposite sides of an upper in the machine, and means for rocking said shafts to adjust said grippers lengthwise of an upper in the machine.

19. In a machine for shaping uppers over lasts, a plurality of cross shafts the ends of which are positioned at opposite sides of an upper in the machine, grippers mounted on each end of each shaft, and means for rocking said shafts to varying extents thereby to adjust said grippers toward and from the toe end of an upper in the machine and lengthwise of the upper toward and from each other.

20. In a machine for shaping uppers over lasts, a plurality of cross shafts the ends of which are positioned at opposite sides of an upper in the machine, upper-engaging grippers one of which is mounted on each end of each shaft, means for rocking said shafts to varying extents thereby to adjust said grippers toward and from the toe end of an upper in the machine and lengthwise of the upper toward and from each other, and means for rocking only one of said shafts thereby to adjust the grippers mounted thereon lengthwise of the upper.

21. In a machine for shaping uppers over lasts, a plurality of rock shafts the ends of which are positioned at opposite sides of an upper in the machine, upper-engaging grippers one of which is mounted on each end of each shaft, an adjustor, connections from the adjustor to said rock shafts constructed and arranged to rock said shafts to varying extents such that said grippers are simultaneously moved lengthwise of the shoe and at the same time are moved toward or from each other, the latter movement having a fixed and predetermined ratio to the former.

22. In a machine for shaping over lasts uppers provided with sole-attaching welts, a gripper slide, a gripper comprising a pair of upper-engaging jaws the lower of which is immovable relatively to the slide, an actuator, means operated by the actuator for moving the slide upward until such movement of the slide is arrested by the engagement of the lower gripper jaw with the welt of the upper, and means operated by the actuator to close the gripper jaws, which means is inoperative until the upward movement of the slide is arrested by its engagement with the upper.

23. In a machine for shaping over lasts uppers having outwardly extending sole-attaching flanges, a gripper slide, a gripper comprising a pair of upper-engaging jaws the lower of which is immovable relatively to the slide, said jaws being constructed and arranged to engage said outwardly extending flange of the upper, an actuator, means operated by the actuator for moving the slide upwardly until such movement of the slide is arrested by the engagement of the lower gripper jaw with the outwardly extending flange of the upper, and means operated by the actuator to close the gripper jaws, which means is rendered operative by the engagement of the lower gripper jaw with the outwardly extending flange of the upper.

EARL A. BESSOM.